United States Patent [19]

Echigo et al.

[11] Patent Number: 4,839,445

[45] Date of Patent: Jun. 13, 1989

[54] SPHERICAL PARTICLES OF THERMOSETTING PHENOLIC RESIN AND PROCESS FOR PRODUCING THE SAME

[75] Inventors: Yoshiaki Echigo, Kyoto; Kenichi Sugawara, Nara; Mutsunori Yamao, Kyoto; Yoshiyuki Suematu, Kyoto; Keiichi Asami, Kyoto; Tuneyuki Ohsawa, Kyoto, all of Japan

[73] Assignee: Unitika, Ltd., Hyogo, Japan

[21] Appl. No.: 141,167

[22] Filed: Jan. 6, 1988

Related U.S. Application Data

[63] Continuation of Ser. No. 907,254, Sep. 15, 1986.

[30] Foreign Application Priority Data

Sep. 17, 1985 [JP] Japan ................................ 60-206103

[51] Int. Cl.$^4$ ............................................. C08G 8/28
[52] U.S. Cl. .................................... 525/503; 525/504; 528/162; 528/164; 528/165
[58] Field of Search ................ 525/503, 504; 528/162, 528/164, 165

[56] References Cited

U.S. PATENT DOCUMENTS

| 2,162,035 | 6/1939 | Seebach | 528/165 X |
| 3,434,997 | 3/1969 | Schmoll | 525/503 X |
| 3,472,915 | 10/1969 | Rider | 528/165 X |
| 4,010,163 | 3/1977 | Hesse et al. | 525/503 X |
| 4,169,937 | 10/1979 | Vargiu et al. | 528/162 X |
| 4,239,869 | 12/1980 | Annis | 525/503 |
| 4,403,076 | 9/1983 | McDonald | 528/165 X |
| 4,542,204 | 9/1985 | Shibahara et al. | 528/165 X |
| 4,640,971 | 2/1987 | Echigo et al. | 528/165 X |
| 4,748,214 | 5/1988 | Asami et al. | 525/503 |

FOREIGN PATENT DOCUMENTS

| 0084681 | 8/1983 | European Pat. Off. . | |
| 0205259 | 12/1986 | European Pat. Off. . | |
| 1167528 | 4/1964 | Fed. Rep. of Germany . | |
| 751161 | 8/1933 | France . | |
| 53-42077 | 11/1978 | Japan . | |
| 760699 | 11/1956 | United Kingdom | 528/165 |

OTHER PUBLICATIONS

Abstract of Japanese Patent Publication 42 077/78, Toyo, May 1976.
English Translation of Japanese Patent Publication No. 42077/78 (Toyo).

Primary Examiner—Howard E. Schain
Attorney, Agent, or Firm—Sughrue, Mion, Zinn, Macpeak & Seas

[57] ABSTRACT

The present invention relates to a process for producing spherical thermosetting phenolic resin particles having a size of no larger than about 1,000 microns, and the spherical thermosetting phenolic resin particles produced by this process.

In accordance with the process of the present invention, a novolak resin, and a nitrogenous basic compound, and, optionally, an aldehyde, are reacted while they are suspended in an aqueous medium in the presence of a suspension stabilizer.

The thermosetting phenolic resin produced by the process of the present invention not only displays superior thermal curing characteristics during molding; the cured product fabricated by molding this resin also exhibits good physical properties such as improved mechanical strength and heat resistance. Therefore, the spherical thermosetting phenolic resin particles produced by the process of the present invention can be extensively used as molding materials, binders, adhesives, and in many other applications.

20 Claims, No Drawings

SPHERICAL PARTICLES OF THERMOSETTING PHENOLIC RESIN AND PROCESS FOR PRODUCING THE SAME

This is a continuation of application Ser. No. 907,254, filed Sept. 15, 1986.

FIELD OF THE INVENTION

The present invention relates to a novel process for producing spherical thermosetting phenolic resin particles, and to spherical thermosetting phenolic resin particles produced by this process.

BACKGROUND OF THE INVENTION

Phenolic resins are a class of plastics that have balanced properties, and which hence are extensively used as molding materials, binders, adhesives, and in many other applications. Phenolic resins are generally classified as novolaks and resoles.

Novolaks are resins that are prepared by thermal reaction, in the presence of an acid catalyst such as oxalic acid or hydrochloric acid, between a phenol and an aldehyde, with the aldehyde-to-phenol molar ratio being set at about from 0.7/1 to about 0.9/1. Molecules of a novolak resin are characterized not only by a structure wherein from 4 to 8 phenol molecules are linked in a straight chain by methylene bonds, but also by methylol groups, which are far smaller in number than in the case of a resole resin. Because of the low content of methylol groups, the novolak resin will not cure by simple heating. Therefore, if the novolak resin is to be used in a cured state, it is usually cured by heating in the presence of from about 8 to about 15 wt% of a curing agent such as hexamethylenetetramine.

Resoles, on the other hand, are the resins that are prepared by reacting a phenol with from about 1.1 to about 1.5 molar excess of an aldehyde in the presence of a basic compound such as aqueous ammonia or sodium hydroxide. The molecule of the resole resin is characterized by a branched structure and the presence of many methylol groups. Becase of the high methylol content, the resole resin will cure simply by heating.

The differences in properties between novolak and resole resins are reflected both in their thermal curing characteristics during the reaction for curing and in the physical properties of the cured molding; the novolak resin that is cured with hexamethylenetetramine is superior to the resole resin cured by simple heating. However, when hexamethylenetetramine is used as a curing agent, it will decompose to evolve ammonia or formaldehyde gas, which causes voids in the shaped article of the cured novolak. In addition, any unreacted hexamethylenetetramine will remain in the shaped novolak to impair its physical properties. Furthermore, it is difficult to achieve uniform dispersion of hexamethylenetetramine in the novolak resin so as to produce an evenly cured molding.

With a view to solving these problems while making the most of the advantages of novolak resins, attempts have been made to react the novolak resin with a basic compound such as hexamethylenetetramine, and, optionally, with an aldehyde. However, the reaction rate of this method is so high that the reaction mixture will gel very rapidly and fail to produce the desired thermosetting phenolic resin.

Methods have also been described for producing a resole resin in the form of spherical solid particles. For instance, U.S. Pat. Nos. 3,823,103, 4,026,828, 4,039,525, 4,206,095, 4,182,696, 4,316,827, and 4,366,303 disclose methods for producing microspherical resole resin particles by emulsion-polymerizing phenols and aldehydes in aqueous media in the presence of both basic catalysts and protective colloids such as gum arabic, gum ghatti, hydroxy alkylated guar gum, and partially hydrolyzed PVA (polyvinyl alcohol). Japanese Patent Publication No. 42077/78 shows a method of producing microspherical resole resin particles by first reacting a phenol and formaldehyde in the presence of a nitrogenous compound such as ethylenediamine, then adding a hydrophilic organic polymer, such as gelatin, casein, or PVA, to the resulting condensation product, and containing the reaction. The phenolic resins produced by these methods are thermosetting, but the thermal curing products thereof are not as satisfactory as the hexamethylenetetramine-cured novolak resin in terms of either the thermal curing characteristics or the physical properties of the articles molded from these phenolic resins.

SUMMARY OF THE INVENTION

One object, therefore, of the present invention is to provide a process for producing spherical thermosetting phenolic resin particles that are not larger than about 1,000 microns in size and which are excellent not only in thermal curing characteristics but also in the physical properties, such as heat resistance and mechanical strength, of articles shaped therefrom.

Another object of the present invention is to provide spherical thermosetting phenolic resin particles produced by this process.

As a result of extensive investigations to attain these objects, the present inventors found that the objects can be fully attained by reacting a novolak resin suspended in an aqueous medium with a particular type of organic compound. The present invention has been accomplished on the basis of this finding.

In one aspect, the present invention relates to a process for producing spherical thermosetting phenolic resin particles with a diameter of not larger than about 1,000 microns by reacting a novolak resin with a nitrogenous basic compound at a temperature sufficient to produce the phenolic resin particles for a period of time sufficient to produce the phenolic resin particles while they are suspended in an aqueous medium in the presence of a suspension stabilizer. The present invention also relates to the spherical thermosetting phenolic resin particles that are produced by this process. In another aspect, the present invention relates to a process for producing spherical thermosetting phenolic resin particles with a diameter of not larger than about 1,000 microns by reacting a novolak resin, an aldehyde, and a nitrogenous basic compound at a temperature sufficient to produce the phenolic resin particles for a period of time sufficient to produce the phenolic resin particles while they are suspended in an aqueous medium in the presence of a suspension stabilizer. The present invention also relates to the spherical thermosetting phenolic resin particles that are produced by this process.

The spherical thermosetting phenolic resin particles of the present invention are prepared using a novolak resin as a starting material. Since the novolak resins used have a straight-chained molecular structure, the present spherical thermosetting phenolic resin particles are far superior in terms of their thermal curing characteristics and the physical properties of the shaped article as compared with the prior art resole resin made from phenols and with the thermosetting phenolic resin particles prepared by reacting a phenol with a molar excess of formalin in an acidic medium.

The process of the present invention has the additional advantage that it is capable of producing spherical thermosetting phenolic resin particles having a desired size not exceeding about 1,000 microns.

DETAILED DESCRIPTION OF THE INVENTION

The novolak resin used as a starting material in the process of the present invention may be prepared as follows: a phenol is reacted with an aldehyde under heated conditions, with the aldehyde-to-phenol molar ratio being set within the range of from about 0.7/1 to about 0.9/1, in the presence of an acid catalyst such as oxalic acid or hydrochloric acid; the reaction product is dehydrated under vacuum, cooled, and ground into particles. Commercial products of this novolak resin are readily available from novolak resin manufactures such as Union Carbide Corporation, Dow Chemical, Monsanto Company, Mitsui Toatsu Chemicals, Inc., and Gun-ei Chemical Industry Co., Ltd. Union Carbide Corporation supplies novolak resins under various trade names such as Bakelite Phenolic Resin BKR-2620, CKR-1634, CKM-2400, and CKM-5254; Mitsui Toatsu Chemicals, Inc. supplies novolak resins under such trade names as Novolak Resin #3000 PN, #6000, #7000, and #9000; and Gun-ei Chemical Industry Co., Ltd. supplies novolak resins under such trade names as RESITOP® PSP-2322 and PSK-2222.

These novolak resins used in the present invention may be prepared in accordance with a process as disclosed, for example, in Sorenson, W. R., Campbell, T. W., *Preparative Methods of Polymer Chemistry*, 2nd Ed., New York: Interscience 1968.

The novolak resin preferably has a melting point of not higher than about 100° C., more preferably from 70° to 100° C., as measured by the method specified in JIS-K-6910. An illustrative novolak resin that satisfies this requirement is Novolak Resin #6000 which is available from Mitsui Toatsu Chemicals, Inc.

Examples of the nitrogenous basic compound that may be used in the present invention include ammonia, hexamethylenetetramine, and alkylamine such as dimethylamine, diethylenetriamine, and polyethyleneimine. These nitrogenous basic compounds are used in amounts which preferably range from about 0.1 to about 50 parts by weight, more preferably from 0.5 to 20 parts by weight, most preferably from 0.5 to 10 parts by weight, per 100 parts by weight of the novolak resin.

Examples of the aldehyde that may be used in the present invention include not only various forms of formaldehyde such as formalin and paraformaldehyde, but also furfural.

Whether the aldehyde is used or not may be appropriately determined in accordance with the specific type of the nitrogenous basic compound used. If hexamethylenetetramine is selected as the nitrogenous basic compound, no aldehyde need be used, and yet the spherical thermosetting phenolic resin particles of the present invention can be produced. If an aldehyde is used, its amount is preferably about 50 parts by weight or less, more preferably 30 parts by weight or less, most preferably from 0.5 to 20 parts by weight, per 100 parts by weight of the novolak resin. Best results are attained by using from 2 to 20 parts by weight of the aldehyde.

Examples of the suspension stabilizer that may by used in the present invention include substantially water-insoluble inorganic salts and organic protective colloids. Substantially water-insoluble inorganic salts are preferably those which have a water solubility of no more than 0.2 g/l at 25° C. and may be exemplified by, for example, calcium fluoride, magnesium fluoride, strontium fluoride, calcium phosphate, magnesium phosphate, barium phosphate, aluminum phosphate, barium sulfate, calcium sulfate, zinc hydroxide, aluminum hydroxide, and iron hydroxide, with calcium fluoride, magnesium fluoride, and strontium fluoride being particularly preferable. These inorganic salts are used in amounts which preferably range from about 0.2 to about 10 parts by weight, and more preferably from 0.5 to 3.5 parts by weight, per 100 parts by weight of the novolak resin. These substantially water-insoluble inorganic salts may be added as is, but, more preferably, two or more water-soluble inorganic salts that are capable of forming such substantially water-insoluble inorganic salts upon reaction with each other are added. To make fluorine compounds of calcium, magnesium, and strontium, as examples, at least one compound selected from the group consisting of sodium fluoride, potassium fluoride, and ammonium fluoride is used as one of the two water-soluble inorganic salts, while at least one compound selected from the group consisting of chlorides, sulfates, and nitrates of calcium magnesium, and strontium is used as the other water-soluble inorganic salt; the so-selected two-water-soluble inorganic salts are added to the reaction system so that they will react with each other to form a fluorine compound of calcium, magnesium, or strontium.

Preferably organic protective colloids include gum arabic, gum ghatti, hydroxy alkyated guar gum, and PVA. These protective colloids are used in amounts which preferably range from about 0.1 to about 20 parts by weight, more preferably from 0.2 to 10 parts by weight, most preferably from 0.5 to 3.5 parts by weight, per 100 parts by weight of the novolak resin. These organic protective colloids may be used in admixture with the substantially water-insoluble inorganic salts.

The size of the spherical thermosetting phenolic resin particles produced by the present invention depends on the amount of the suspension stabilizer used, and, the more it is used, the smaller the size of the spherical particles obtained.

The aqueous medium used in the present invention is preferably water, which may have a small amount of a water-soluble organic solvent (e.g., methyl alcohol, ethyl alcohol, or acetone) dissolved therein. The organic solvent is preferably used in an amount of no more than about 5 parts by weight per 100 parts by weight of water. The aqueous medium is used in such an amount that the solids content of the novolak resin preferably ranges from about 10 to about 90 wt%, more preferably from 20 to 70 wt%, and most preferably from 30 to 60 wt%, of the total amount of the aqueous medium and the novolak resin.

In practicing the process of the present invention for producing spherical thermosetting phenolic resin particles, the starting materials, i.e., the novolak resin and the nitrogenous basic compound, and, optionally an aldehyde, are reacted under heated conditions while they are suspended in an aqueous medium in the presence of a suspension stabilizer. The reaction temperature ranges preferably from about 70 to about 100° C., more preferably from 80° to 100° C., and most preferably from 90° to 98° C.

These starting materials, the suspension stabilizer, and the aqueous medium may be charged by any method and in any order. For instance, water and the suspension stabilizer are first charged into the reactor, then heated to 95° C. with stirring, and a molten novolak resin is charged into the reactor with continued stirring at 95° C., followed by addition of the nitrogenous basic compound and, the aldehyde as required. Alternatively, water and the novolak resin are charged into the reactor, then heated to 95° C. with stirring, and thereafter, the suspension stabilizer, the nitrogenous basic compound, and the aldehyde if required, are successively charged into the reactor with continued stirring at 95° C.

After all necessary components have been charged, the mixture is heated with continued stirring for a time period which preferably ranges from about 5 to about 120 minutes, more preferably from 5 to 90 minutes, and most preferably from 10 to 40 minutes. If the heating is continued longer than about 120 minutes, the curing reaction will proceed to such an extent that it becomes difficult to attain the desired thermosetting phenolic resin. After completion of the reaction, the reaction product is cooled to about 40° C. or below, then the solid is separated by an appropriate method such as filtration or centrifugation, and the recovered solid is washed with water and subsequently dried to obtain spherical thermosetting phenolic resin particles.

The process of the present invention may be performed either continuously or batchwise.

The process of the present invention which uses a novolak resin as a starting resin features a more viscous oil phase than the heretofore known methods of producing resole resins starting from phenols, so that the oil phase dispersed in the aqueous medium to form a suspension has a tendency to resist the formation of micro particles. Therefore, the spherical thermosetting phenolic resin particles obtained by the present invention will not have extremely small sizes; in addition, their size distribution has a tendency to become narrower than any of the resole resins that are produced by known processes. For these reasons, the present invention provides for simple production of spherical thermosetting phenolic resin particles that range from about 2 to about 1,000 microns in size in which yet have a comparatively narrow size distribution.

The resin is considered to have "cured" if it is no longer fusible. For the purposes of the present invention, the resin may be regarded as having been "cured" if it is not fusible and practically defies geltime measurement by the "Method of Determining the Gel Time of Thermosetting Resins" specified in JIS-K-6910.

The size of the spherical thermosetting phenolic resin particles produced by the present invention may be measured by examination under a microscope at a magnification of about 300. The size distribution of these particles may be determmined with a Coulter counter (described in more detail below).

The term "spherical" as used herein generally refers to substantially spherical particles, but it should be understood that this term is broad enough to cover incomplete spheres (wherein part of the sphere is missing) and spherical particles that have agglomerated to form secondary particles.

The term "suspension" as used herein means the state in which the novolak resin is dispersed as tiny droplets in the aqueous medium, and the suspension stabilizer is a compound of salt which serves to stabilize this state.

In accordance with the process of the present invention, the novolak resin, the nitrogenous basic compound, and, optionally the aldehyde, are caused to react in an aqueous medium in the presence of the suspension stabilizer, and, in this case, a thermoplastic resin, a thermosetting resin, a flame-retardant, a foaming agent, a reinforcing agent, a filler, an extender, a leveling agent, a flow control agent, a stabilizer, an antistat, an electrical conductivity providing agent, a dye, a pigment, and any other appropriate additives may be incorporated in the reaction system.

Preferable thermoplastic resins which can be incorporated in the reaction system are those which have miscibility with the novolak resin, and include polyolefins such as polyethylene, polypropylene, polystyrene, rubber-modified polystyrene, AS (acylonitrile/styrene copolymer), ABS (acrylonitrile/butadiene/styrene copolymer), polyvinyl chloride, polymethyl methacrylate, and ethylene/vinyl acetate copolymers; polyesters such as polyethylene terephthalate, polybutylene tetehthalate, polycarbonate, and polyarylates; polyamides such as polycaprolactam and polyhexamethylene adipamide; and polysulfones and polyphenylene sulfides.

Illustrative thermosetting resins which can be incorporated in the reaction system include melamine resins, urea resins, furan resins, alkyd resins, and unsaturated polyester resins.

Suitable flame-retardants which can be incorporated in the reaction system include halogen compounds typified by decabromodiphenyl ether.

Suitable reinforcing agents, fillers and extenders include talc, glass fibers, asbestos fibers, carbon fibers, metal fibers, quartz, mica, kaolin, aluminum oxide, silica, aluminum hydroxide, and antimony trioxide.

Other additives that may be used include titanium oxide, iron oxide, aluminum powder, iron powder, metal soap, carbon black, wood flour, and paper.

The spherical thermosetting phenolic resin particles produced by the process of the present invention may be optionally used as compositions wherein they are blended with thermoplastic resins, thermosetting resins, flame-retardants, foaming agents, reinforcing agents, fillers, extenders, levelling agents, flow control agents, stabilizers, antistats, electrical conductivity providing agents, dyes, pigments, and any other suitable components.

Preferable thermoplastic resins for blending are those which have miscibility with the novolak resin and include polyolefins such as polyethylene, polypropylene, polystyrene, rubber-modified polystyrene, AS, ABS, polyvinyl chloride, polymethyl methacrylate, and ethylene/vinyl acetate copolymers; polyesters such as polyethylene terephthalate, polybutylene terephthalate, polycarbonate, and polyarylates; polyamides such as polycaprolactam and polyhexamethylene adipamide; polysulfones and polyphenylene sulfides.

Illustrative thermosetting resins for blending include melamine resins, urea resins, furan resins, alkyd resins, and unsaturated polyester resins.

Illustrative flame-retardants for blending include halogen compounds as typified by decabromodiphenyl ether, and inorganic and organic phosphorus compounds.

Suitable reinforcing agents, fillers, and extenders include talc, glass fibers, asbestos fibers, carbon fibers, metal fibers, quartz, mica, kaolin, aluminum oxide, silica, aluminum hydroxide, and antimony trioxide.

For the improvements of stiffness, electromagnetic masking property, releasability, conductivity, sliding property, coloring property, etc., effective components such as titanium oxide, iron oxide, aluminum powder, iron powder, metal soap, carbon black, wood flour, and paper may be used.

The thermosetting phenolic resin particles produced by the process of the present invention are loose and infusible spherical solid particles; these particles not only have good flow characteristics, but also exhibit good curing characteristics during thermal curing. Therefore, not only can these particles be molded with great ease but also the resulting shaped articles have excellent physical properties and appearance. Because of these advantages, the spherical thermosetting phenolic resin particles of the present invention can be extensively used as molding materials, binders, and adhesives, and in many other applications.

The following examples are provided for the purpose of further illustrating the present invention but should in no sense be taken as limiting the invention.

EXAMPLE 1

A glass flask (capacity: 1,000 ml) was charged with 20 g of formalin (37 wt% formaldehyde solution), 200 g of water, 8.4 g of calcium chloride, and 5.8 g of potassium fluoride, and the mixture was heated to 95° C. with stirring. With continued stirring, 200 g of a molten novolak resin (#6000 of Mitsui Toatsu Chemicals, Inc.; m.p.: 70°–76° C.) was added and a dispersion was formed. To the dispersion, 10 g of hexamethylenetetramine in 100 g of water was added and reaction was conducted with stirring at 95° C. for 10 minutes. The reaction mixture was cooled to 30° C. and, after addition of 500 g of water, the solid was recovered on filter paper and washed with water. The resulting resin particles were dried by heating at 35° C. for 24 hours under vacuum ($\leqq 5$ mmHg) to obtain a resin particle in substantially spherical shape. The resin obtained was designated as Resin A.

EXAMPLES 2 TO 5

Additional particulate resins were obtained by repeating the procedures of Example 1 except that the reaction time was changed to 5, 20, 40, and 80 minutes. These resulting resin particles had substantially sherical shape, respectively. The resins obtained were designated as Resins B, C, D, and E, respectively.

EXAMPLE 6

A glass flask (capacity: 1,000 ml) was charged with 200 g of a novolak resin (#6000 of Mitsui Toatsu Chemicals, Inc.; m.p.: 70°–76° C.), 150 g of water, and 4 g of gum arabic, and the mixture was heated to 95° C. with stirring. To the heated mixture, 20 g of hexamethylenetetramine in 150 g of water was added and the resulting mixture was subjected to reaction for 15 minutes with continued stirring at 95° C. The reaction mixture was cooled to 30° C., and, after addition of 500 g of water, the solid was recovered on filter paper and washed with water. The resulting resin particles were dried by heating at 35° C. for 24 hours vacuum ($\leqq 5$ mmHg) to obtain a resin particle in substantially spherical shape. The resin obtained was designated as Resin F.

EXAMPLE 7

An additional particulate resin was prepared by repeating the procedures of Example 6, except that the novolak resin was changed to #3000 PN of Mitsui Toatsu Chemicals, Inc. (m.p.: 75°–90° C.). The resulting resin particles had substantially spherical shape. The resin obtained was designated as Resin G.

EXAMPLE 8

An additional particulate resin was prepared by repeating the procedures of Example 6, except that the amount of gum arabic was reduced to 2 g. The resulting particles had substantially spherical shape. The resin obtained was designated as Resin H.

COMPARATIVE EXAMPLE 1

A particulate resin was prepared as in Example 1, except that the reaction time was increased to 160 minutes. The resulting resin particles had substantially spherical shape. The resin obtained was designated as Resin I.

COMPARATIVE EXAMPLE 2

A hundred grams of a novolak resin (#6000 of Mitsui Toatsu Chemicals, Inc.; m.p.: 70°–76° C.) and 10 g of hexamethylenetetramine were charged into a 300 ml stainless ball mill (Model U-1M of Irie Shokai Co., Ltd; 70 mm in inside diameter and 80 mm in depth; dynamic range of rotational speed: 0-10; ball diameter: 2.0 mm). The feed was mixed and ground for 30 minutes at room temperature, with the rotational speed reading at 8, so as to obtain a resin composition composed of hexamethylenetetramine and the novolak resin. This resin composition was designated as Resin J.

COMPARATIVE EXAMPLE 3

An additional resin composition composed of hexamethylenetetramine and a novolak resin was prepared by repeating the procedures of Comparative Example 2, except that the novolak resin was changed to #3000 PN of Mitsui Toatsu Chemicals, Inc. (m.p.: 75°–90° C.). This resin composition was designated as Resin K.

COMPARATIVE EXAMPLE 4

Two hundred grams of a novolak resin (#6000 of Mitsui Toatsu Chemicals, Inc.) was mixed with 20 g of hexamethylenetetramine for 10 minutes aat 90° C. The mixture was then cooled to room temperature, charged into a stainless ball mill (Model U-1M of Irie Shokai Co., Ltd.; 70 mm in inside diameter and 80 mm in depth; dynamic range of rotational speed: 0-10; ball diameter: 2.0 mm), and mixed and ground for 30 minutes at room temperature, with the rotational speed reading at 8, so as to obtain a resin composition composed of hexamethylenetetramine and the novolak resin. This resin composition was designated as Resin L.

COMPARATIVE EXAMPLE 5

An additional resin composition composed of hexamethylenetetramine and a novolak resin was prepared by repeating the procedures of Comparative Example 4 except that the temperature for mixing was increased to 130° C. This resin composition was designated as Resin M.

The 150° C. hotplate gel time was measured in accordance with JIS-K-6910 as stated below for each of the resins A to H prepared in Examples 1 to 8 and for resins I to M prepared in Comparative Examples 1 to 5. The results are shown in Table 1 below.

Measurement of Gel Time (JIS-K-6910)

Copper-plate (about 10 cm length × about 10 cm width × about 10 mm thickness) having placed thereon a stainless spatula (about 20 mm width × about 1 mm thickness) was heated at 150° C. while controlling the temperature of the copper-plate and spatula to a precision of ±° C. About 0.5 g of the sample (resin particles or powders) was uniformly placed in the circular form having a diameter of about 3 cm on the heated copper-plate. Thereafter, the sample was rubbed out by jamming it with the spatula at the rate of once per second until the roping between the sample and ths spatula was not caused. The time of from placing the sample on the copper-plate till causing no roping between the spatula and the sample was measured three times. The average value of the times measured was referred to as a gel time.

TABLE 1

| Run No. | Resin | Gel Time (sec) |
|---|---|---|
| Example 1 | A | 40 |
| Example 2 | B | 63 |
| Example 3 | C | 36 |
| Example 4 | D | 21 |
| Example 5 | E | 15 |
| Example 6 | F | 52 |
| Example 7 | G | 46 |
| Example 8 | H | 51 |
| Comparative Example 1 | I | not measured (gelling occurred) |
| Comparative Example 2 | J | 63 |
| Comparative Example 3 | K | 61 |
| Comparative Example 4 | L | 58 |
| Comparative Example 5 | M | not measured (gelling occurred) |

Table 1 clearly shows that the phenolic resins prepared in accordance with the present invention were thermosetting and displayed superior characteristics during thermal curing.

Subsequently, the average particle size and size distribution of each of the resins A through H prepared in Examples 1 through 8 were measured with a Coulter counter (Model TA-II of Nikkaki K.K.), with the following scales being used to estimate the abundance of individual particles: 1 micron increments for ≦10 microns; 10 microns increments for from 10 to 100 microns; and 100 microns increments for ≧100 microns. The average particle size as defined in the present invention was the value corresponding to the greatest of all the values for abundance thus estimated. The particle size distribution as defined in the present invention is expressed by a maximum particle size and a minimum size for the range within which at least 70 wt% of the total weight of the particles examined was found. The results of the measurements are summarized in Table 2 below.

TABLE 2

| Run No. | Resin | Average Particle Size (micron) | Particle Size Distribution (micron) |
|---|---|---|---|
| Example 1 | A | 90–100 | 70–200 |
| Example 2 | B | 90–100 | 70–200 |
| Example 3 | C | 90–100 | 70–200 |
| Example 4 | D | 90–100 | 70–200 |
| Example 5 | E | 90–100 | 70–200 |
| Example 6 | F | 100–200 | 80–300 |
| Example 7 | G | 200–300 | 100–400 |
| Example 8 | H | 400–500 | 300–600 |

Resins A through L, except for I, were pressformed into moldings (10 cm length × 2 cm width × 5 mm thickness) at a mold temperature of 160° C. for a compression of 150 kg/cm². The duration of compression time was varied for 3, 5, and 7 minutes. Cross sections of the moldings were examined under a microscope; no voids were found in the moldings made from resins A through H but those which were fabricated from resins J, K, and L contained voids that were probably formed by ammonia gas. The flexural strengths and heat distortion temperatures of the moldings were measured in accordance with JIS-K-6911 and ASTM D648 (18.5 kg/cm²) as stated below, respectively. The results are shown in Table 3 below.

Measurement of Flexural Strength (JIS-K-6911)

A molded sample (100 mm length × 4 mm height × 10 mm width) was prepared. The dimension of the sample was accurately measured under a precision of 0.01 mm by means of a micrometer. The molded sample was horizontally supported at the distance of 64 mm between the supports. Then, a pressure wedge was placed on the center thereof to add a load to the molding, and its wedge was moved down at a rate of 2 mm/min until the molding was broken. Then, the load when the molding was broken was measured under a precision of 0.1 kg. The flexural strength was calculated from the measured breaking load and the accurate cross-section was calculated from the dimension of the molded sample.

Measurement of Heat Distortion Temperature (ASTN D648)

The molded sample (5 in. length × ½ in. width × ⅛ in. thickness) was horizontally supported at the distance of 4 in. between the supports such that the direction of the ½ in. width was vertical. Then, a load of 18.5 kg/cm² was applied to the center of the molded sample and heated up at a rate of 2° C./min. Then, the temperature when the molding was deformed till 0.01 in. was measured. The temperature measured was referred to as a heat distortion temperature.

TABLE 3

| Run No. | Resin | Flexural Strength (kg/mm²) 3 min* | 5 min* | 7 min* | Heat Distortion Temperature (°C.) 3 min* | 5 min* | 7 min* |
|---|---|---|---|---|---|---|---|
| Example 1 | A | 11.7 | 11.5 | 11.6 | 159 | 164 | 166 |
| Example 2 | B | 9.1 | 9.5 | 9.7 | 150 | 150 | 151 |
| Example 3 | C | 10.5 | 11.5 | 11.6 | 163 | 166 | 167 |
| Example 4 | D | 10.4 | 12.0 | 11.9 | 165 | 167 | 168 |
| Example 5 | E | 11.5 | 12.2 | 12.1 | 161 | 167 | 167 |
| Example 6 | F | 11.4 | 12.1 | 12.3 | 151 | 158 | 159 |
| Example 7 | G | 11.1 | 11.9 | 11.6 | 153 | 159 | 160 |
| Example 8 | H | 10.0 | 12.0 | 12.2 | 151 | 157 | 159 |
| Comparative Example 2 | J | 7.1 | 10.1 | 10.0 | 121 | 142 | 150 |
| Comparative Example 3 | K | 7.2 | 8.8 | 8.7 | 117 | 138 | 142 |
| Comparative | L | 6.5 | 8.9 | 8.6 | 116 | 143 | 148 |

TABLE 3-continued

| Run No. | Resin | Flexural Strength (kg/mm²) | | | Heat Distortion Temperature (°C.) | | |
|---|---|---|---|---|---|---|---|
| | | 3 min* | 5 min* | 7 min* | 3 min* | 5 min* | 7 min* |
| Example 4 | | | | | | | |

*indicates the compression period

Compared with the moldings made from the comparative resins, those made from the phenolic resins prepared in accordance with the present invention displayed superior heat distortion temperatures and flexural strengths even when the compression period was only 3 minutes. It is therefore clear that the phenolic resins of the present invention will cure rapidly. Table 3 also shows that even the moldings made by compressing the comparative resins for as long as 7 minutes were inferior to those fabricated from the resins of the present invention in terms of both heat distortion temperature and flexural strength.

It is generally considered that a novolak resin, when cured with a curing agent, displays better thermal curing characteristics than a phenol-derived resole resin being thermally cured, and the cured molding also exhibits superior physical properties. However, even such novolak resin is inferior to the thermosetting phenolic resin produced by the method of the present invention, not only with respect to the thermal curing characteristics displayable during forming, but also in terms of the physical properties such as mechanical strength and heat resistance of the cured molding.

While the invention has been described in detail and with reference to specific embodiments thereof, it will be apparent to one skilled in the art that various changes and modifications can be made therein without departing from the spirit and scope thereof.

What is claimed is:

1. A process for producing spherical thermosetting phenolic resin particles with a size of no larger than about 1,000 microns which comprises reacting a novolak resin with a nitrogenous basic compound at a temperature sufficient to produce said phenolic resin particles for a period of time sufficient to produce said phenolic resin particles while they are suspended in an aqueous medium in the presence of a suspension stabilizer.

2. A process according to claim 1, wherein said nitrogenous basic compound is hexamethylenetetramine.

3. A process according to claim 1, wherein said nitrogenous basic compound is used in an amount of from about 0.1 to about 50 parts by weight per 100 parts by weight of the novolak resin.

4. A process according to claim 2, wherein said hexamethylenetetramine is used in an amount of from about 0.1 to about 50 parts by weight per 100 parts by weight of the novolak resin.

5. A process according to claim 1, wherein said nitrogenous basic compound is used in an amount of from 0.5 to 20 parts by weight per 100 parts by weight of the novolak resin.

6. A process according to claim 2, wherein said hexamethylenetetramine is used in an amount of from 0.5 to 20 parts by weight per 100 parts by weight of the novolak resin.

7. A process for producing spherical thermosetting phenolic resin particles with a size of no larger than about 1,000 microns which comprises reacting a novolak resin, an aldehyde, and a nitrogenous basic compound at a temperature sufficient to produce said phenolic resin particles for a period of time sufficient to produce said phenolic resin particles while they are suspended in an aqueous medium in the presence of a suspension stabilizer.

8. A process according to claim 7, wherein said nitrogenous basic compound is hexamethylenetetramine.

9. A process according to claim 7, wherein said nitrogenous basic compound is used in an amount of from about 0.1 to about 50 parts by weight, and said aldehyde is used in an amount of about 50 parts by weight or less, per 100 parts by weight of the novolak resin.

10. A process according to claim 8, wherein said hexamethylenetetramine is used in an amount of from about 0.1 to about 50 parts by weight, and said aldehyde is used in an amount of about 50 parts by weight or less, per 100 parts by weight of the novolak resin.

11. Spherical thermosetting phenolic resin particles with a size of no larger than about 1,000 microns which are produced by reacting a novolak resin with a nitrogenous basic compound at a temperature sufficient to produce said phenolic resin particles for a period of time sufficient to produce said phenolic resin particles while they are suspended in an aqueous medium in the presence of a suspension stabilizer.

12. Spherical thermosetting phenolic resin particles according to claim 11, wherein said nitrogenous basic compound is hexamethylenetetramine.

13. Spherical thermosetting phenolic resin particles according to claim 11, wherein said nitrogenous basic compound is used in an amount of from about 0.1 to about 50 parts by weight per 100 parts by weight of the novolak resin.

14. Spherical thermosetting phenolic resin particles according to claim 12, wherein said hexamethylenetetramine is used in an amount of from about 0.1 to about 50 parts by weight per 100 parts by weight of the novolak resin.

15. Spherical thermosetting phenolic resin particles according to claim 11, wherein said nitrogenous basic compound is used in an amount of from 0.5 to 20 parts by weight per 100 parts by weight of the novolak resin.

16. Spherical thermosetting phenolic resin particles according to claim 12, wherein said hexamethylenetetramine is used in an amount of from 0.5 to 20 parts by weight per 100 parts by weight of the novolak resin.

17. Spherical thermosetting phenolic resin particles with a size of no larger than about 1,000 microns which are produced by reacting a novolak resin, an aldehyde, and a nitrogenous basic compound at a temperature sufficient to produce said phenolic resin particles for a period of time sufficient to produce said phenolic resin particles while they are suspended in an aqueous medium in the presence of a suspension stabilizer.

18. Spherical thermosetting phenolic resin particles according to claim 17, wherein said nitrogenous basic compound is hexamethylenetetramine.

19. Spherical thermosetting phenolic resin particles according to claim 17, wherein said nitrogenous basic compound is used in an amount of from about 0.1 to about 50 parts by weight, and said aldehyde is used in an amount of about 50 parts by weight or less, per 100 parts by weight of the novolak resin.

20. Spherical thermosetting phenolic resin particles according to claim 18, wherein said hexamethylenetetramine is used in an amount of from about 0.1 to about 50 1 parts by weight, and said aldehyde is used in an amount of about 50 parts by weight or less, per 100 parts by weight of the novolak resin.

* * * * *